(12) United States Patent
Rose et al.

(10) Patent No.: US 10,635,472 B2
(45) Date of Patent: Apr. 28, 2020

(54) IMPORT MECHANISM FOR HARDWARE INTRINSICS

(71) Applicant: Oracle International Corporation, Redwood Shores, CA (US)

(72) Inventors: John R. Rose, San Jose, CA (US); Vladimir Ivanov, Saint Petersburg (RU)

(73) Assignee: Oracle International Corporation, Redwood Shores, CA (US)

( * ) Notice: Subject to any disclaimer, the term of this patent is extended or adjusted under 35 U.S.C. 154(b) by 236 days.

(21) Appl. No.: 15/331,162

(22) Filed: Oct. 21, 2016

(65) Prior Publication Data

US 2017/0116017 A1 Apr. 27, 2017

Related U.S. Application Data

(60) Provisional application No. 62/245,788, filed on Oct. 23, 2015.

(51) Int. Cl.
*G06F 9/455* (2018.01)
*G06F 8/65* (2018.01)

(52) U.S. Cl.
CPC ............ *G06F 9/45558* (2013.01); *G06F 8/65* (2013.01); *G06F 2009/45579* (2013.01)

(58) Field of Classification Search
CPC .................... G06F 9/45558; G06F 8/65; G06F 2009/45579
See application file for complete search history.

(56) References Cited

U.S. PATENT DOCUMENTS

| 6,799,262 | B1 * | 9/2004 | Blandy | ...................... G06F 8/45 712/200 |
| 8,015,543 | B1 * | 9/2011 | Carrick | ...................... G06F 8/35 717/106 |
| 9,690,709 | B2 | 6/2017 | Sandoz et al. | |
| 2013/0290941 | A1 * | 10/2013 | Kruglick | ............. G06F 9/45516 717/148 |

(Continued)

OTHER PUBLICATIONS

John Rose, The Isthmus in the VM, blogs.oracle.com/jrose/entry/the_isthmus_in_the_vm, Mar. 17, 2014 (Year: 2014).*

(Continued)

*Primary Examiner* — Duy Khuong T Nguyen
*Assistant Examiner* — Kevin X Lu
(74) *Attorney, Agent, or Firm* — Hickman Palermo Becker Bingham LLP

(57) ABSTRACT

In one approach, an import mechanism allows new hardware intrinsics to be utilized by writing or updating a library of source code, rather than specifically modifying the virtual machine for each new intrinsic. Thus, once the architecture is in place to allow the import mechanism to function, the virtual machine itself (e.g. the code which implements the virtual machine) no longer needs to be modified in order to allow new intrinsics to be utilized by end user programmers. Since source code is typically more convenient to write than the language used to implement the virtual machine and the risk of miscoding the virtual machine is minimized when introducing new intrinsics, the import mechanism described herein increases the efficiency at which new hardware intrinsics can be introduced.

19 Claims, 6 Drawing Sheets

(56) References Cited

U.S. PATENT DOCUMENTS

| | | |
|---|---|---|
| 2015/0363174 A1 | 12/2015 | Rose et al. |
| 2016/0011982 A1 | 1/2016 | Sandoz et al. |
| 2016/0048417 A1* | 2/2016 | Gschwind ............... G06F 8/443 719/320 |
| 2016/0321039 A1* | 11/2016 | Chaudhuri ................ G06F 8/51 |
| 2016/0357586 A1 | 12/2016 | Rose |
| 2016/0371101 A1* | 12/2016 | Beale ...................... G06F 3/061 |
| 2017/0039043 A1 | 2/2017 | Haupt et al. |

OTHER PUBLICATIONS

Vladimir, Invokedynamic: Deep Dive, Mar. 14, 2015 (Year: 2015).*
Unknown Author, "Project Panama: Interconnecting JVM and native code", Sep. 20, 2014 (Year: 2014).*
Immo Landwerth, "The JIT finally proposed. JIT and SIMD are getting married", Apr. 7, 2014 (Year: 2014).*

* cited by examiner

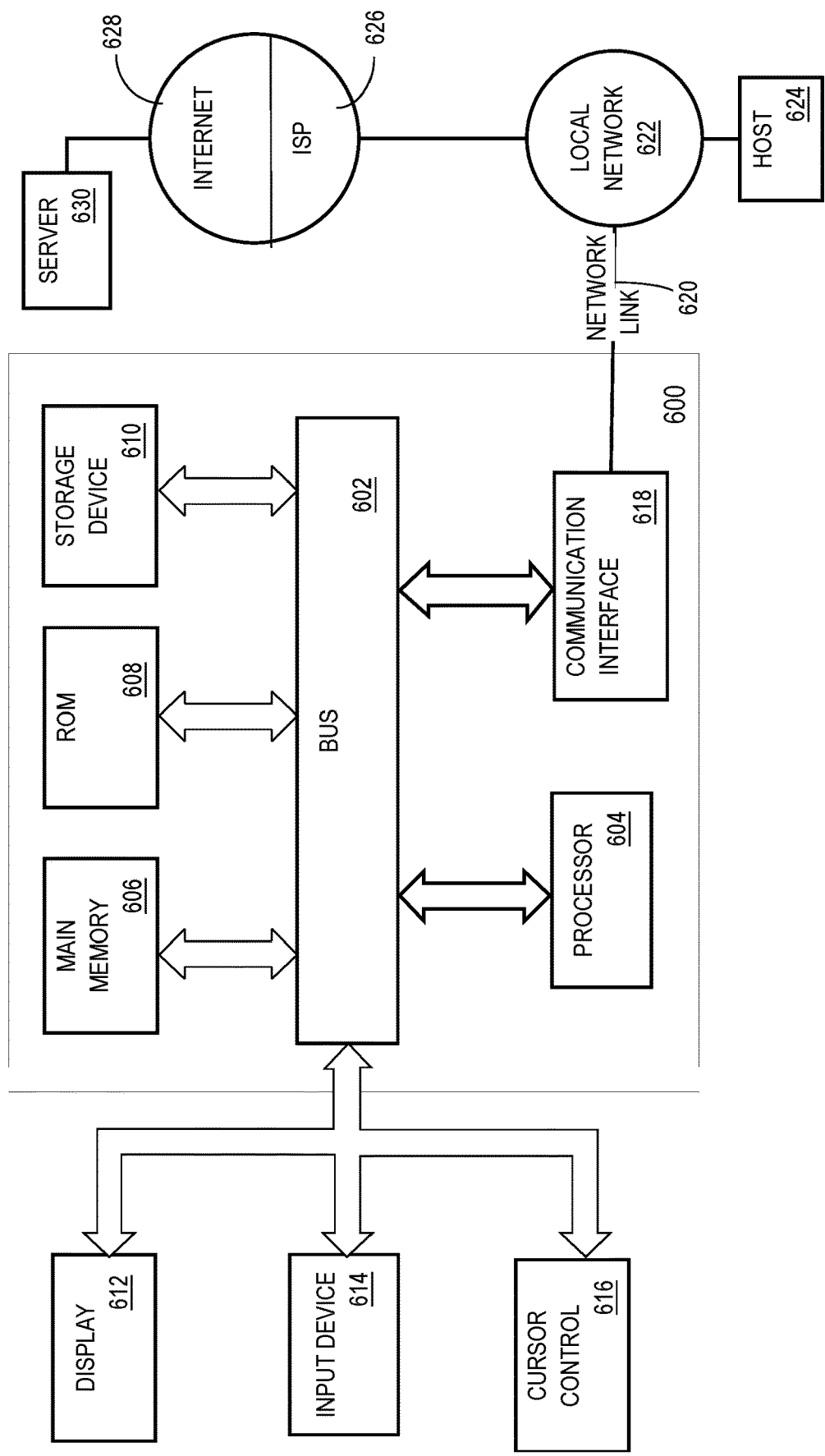

IMPORT MECHANISM FOR HARDWARE INTRINSICS

PRIORITY CLAIMS AND RELATED CASES

This application claims the benefit of Provisional Application No. 62/245,788 filed Oct. 23, 2016, the entire contests of which is hereby incorporated by reference as if fully set forth herein, under 35 U.S.C. § 120.

TECHNICAL FIELD

Embodiments relate generally to an adaptable framework for importing new hardware intrinsics into a virtual machine operating environment.

BACKGROUND

A hardware intrinsic represents an instruction or set of instructions that is natively supported and implemented by a given Central Processing Unit (CPU) or other type of computer processor. In most cases, the architecture of a given CPU includes an instruction set which identifies the base operations that the CPU is able to perform. These operations range from fairly simple, such as an add instruction which adds the values within two input registers and outputs the result to an output register, to very complex operations, such as performing encryption under one or more cryptographic schemes and vector operations. However, the machine code needed to access said operations tends to be painstakingly difficult to program directly. Thus, most programmers use "high-level" programming languages, such as C++, Java, Ruby, and so forth which are designed to be more "human readable" and which rely on compilers and/or interpreters to transform the program instructions written for a higher-level language into the machine instructions that can actually be executed by the underlying hardware. In some cases, multiple levels of compilers and/or interpreters are used, such as the case with the Java operating environment.

The Java operating environment generally comprises at least two tiers of transformation. The first tier is the use of a source compiler to convert Java source code into an intermediate language referred to as "byte code". The second tier uses a Java Virtual Machine (JVM) to convert the "byte code" into machine instructions that can execute on the underlying hardware via a Just-in-Time (JIT) compiler, an interpreter, or a combination of both. The multi-tiered approach taken by Java allows programmers of Java source code to write code that is the same across all platforms without worrying about the underlying hardware. As a result, the work needed to ensure cross compatibility between platforms is drastically reduced, allowing Java programs to be developed in a safe and efficient manner. Instead, the task of ensuring cross-compatibility is placed on the JVM, which is responsible for determining the capabilities of the underlying hardware and converting the bytecode instructions into machine instructions that can actually execute on the underlying hardware.

One issue that the developers of virtual machines, such as the JVM, encounter is how to introduce new hardware intrinsics into the virtual machine operating environment. As technology progresses, the instruction set supported by CPUs continues to expand. For instance, CPU manufacturers may identify certain sets of instructions which are typically executed together and instead choose to implement a new instruction in the hardware of the CPU that can achieve the same effect with fewer clock cycles. However, once a new hardware intrinsic becomes available on a CPU, the developers of the virtual machine have to perform many infrastructure changes, oftentimes manually, in order to utilize the new functionality. This is further compounded by the fact that CPU manufacturers do not always standardize functionality or the manner in which the functionality should be used. Thus, different CPUs may provide different sets of functionality and/or may adhere to completely different calling conventions and/or Application Binary Interfaces (ABIs). Thus, in addition to introducing the new functionality into the virtual machine operating environment, the developers also have to program multiple implementations corresponding to the different hardware environments, often also including an implementation for hardware that does not natively support the new functionality.

Presently, importing a new hardware intrinsic requires a long jagged cut through multiple layers of both the source language and the virtual machine operating environment. Using Java as an example, the steps currently followed to import a new hardware intrinsic include surfacing the intrinsic in the Java language (often through a Java method), organizing the definition of the method to mark the method as an a specific intrinsic, modifying the JVM to recognize the mark, and in response to detecting the mark perform special processing for the specified type of intrinsic. The special processing often includes tasks such as defining how data should be passed to the hardware intrinsic (such as which registers to populate before execution and which registers to extract the result from), checks to determine whether the underlying hardware supports the intrinsic, and selection of machine code to execute which emits the instruction based on the capabilities of the underlying hardware. In order to effect such changes, developers of the JVM often have to manually modify many different points within the Java language and the JVM in order to utilize to utilize the new hardware intrinsic. Although a JVM is used in the above example, the issue presented above is applicable to many different virtual machine designs. Thus, a design architecture for a virtual machine that minimizes the number of points that need to be modified, especially within the design of the virtual machine itself as opposed to the source language, would allow new hardware intrinsics to be added in a more expedient and efficient manner.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6 is a block diagram that illustrates a computer system upon which an embodiment of the invention may be implemented.

DETAILED DESCRIPTION

Figure 1:
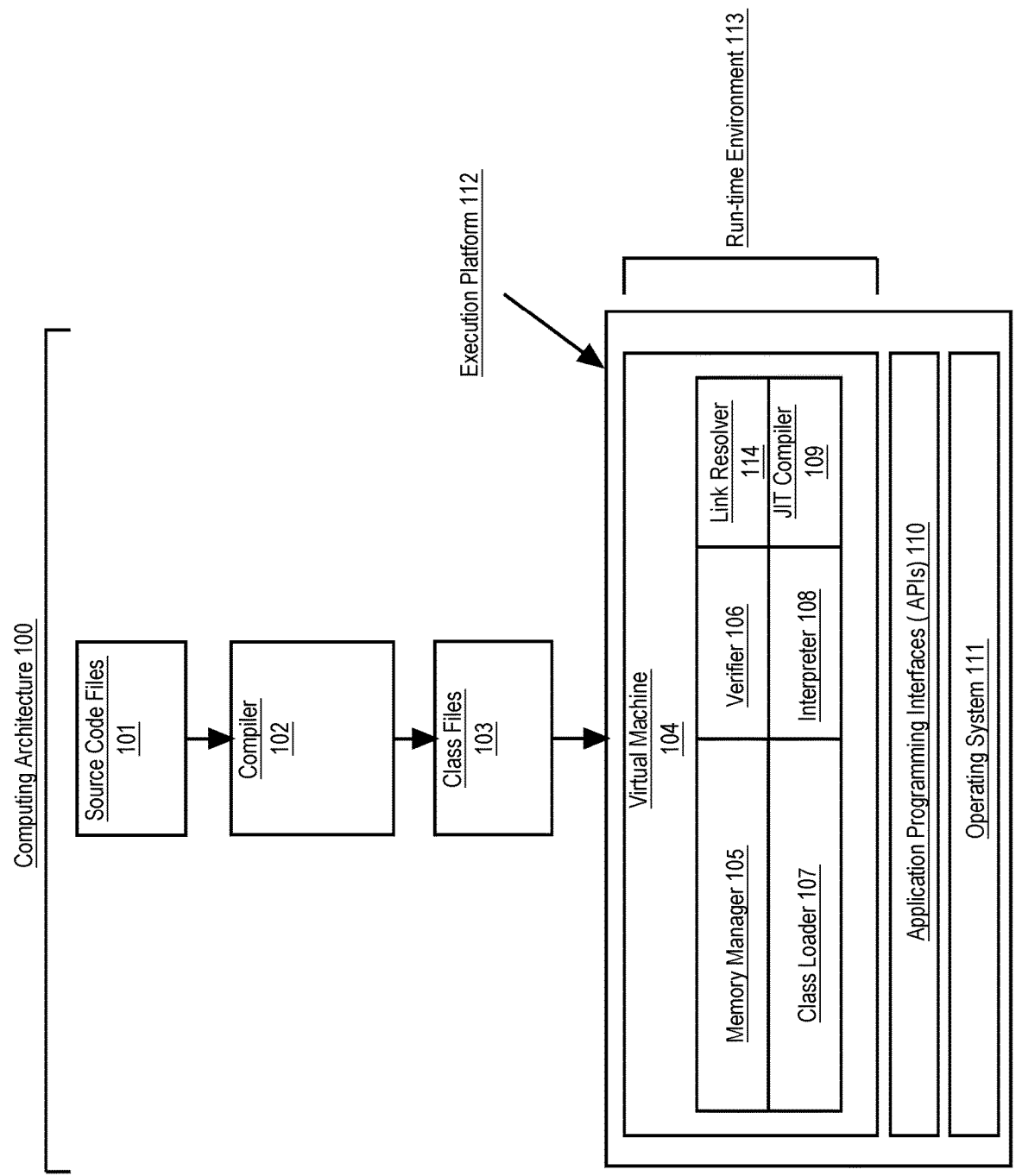
FIG. 1 illustrates an example computing architecture in which techniques described herein may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
1.0 General Overview
2.0 Example Operating Environment
  2.1 Example Class File Structure
  2.2 Example Virtual Machine Architecture
  2.3 Loading, Linking, and Initializing
3.0 Source File Representation
4.0 Executing a Hardware Intrinsic
5.0 Enhanced Make Intrinsic Methods
6.0 Extensions and Alternatives
7.0 Additional Disclosure

1.0. General Overview

Described herein are techniques that allow new hardware intrinsics to be imported into a computing architecture in an expedient and efficient manner.

The techniques described herein use terms and definitions from the Java programming language, the Java Virtual Machine ("JVM"), and the Java Runtime Environment. It is contemplated, however, that the described techniques may be used in conjunction with any programming language, virtual machine architecture, or run-time environment. Thus, for example, terminology described in Java terms, such as "methods", are interchangeable with other terminology, such as "functions" and "logic". Thus, the term "method" does not to limit the application of the techniques described herein to Java, the JVM, or any particular language or operating environment. Furthermore, the term "method" is also synonymous with the terms "class method" or "object method". A method is a set or block of code which is referred to by name and can be called at various points in a program, which causes the method's code to be executed. The term "invoke" is also synonymous with the term "call". Thus, when a first method "calls" or "invokes" a second method, this represents the first method causing the second method to be executed. A point in a program which invokes a method is described variously using terms such as "call site", "invocation instruction", "invoke command", and so forth.

In an embodiment, a virtual machine includes an import mechanism for new hardware intrinsics that minimizes the manual modifications that have to be performed and optimizes the execution of the hardware intrinsics. In some embodiments, the virtual machine leverages "method handles" in order to implement the mechanism for importing hardware intrinsics into a virtual machine environment. A "method handle" is an executable reference to an underlying method, constructor, field, or other similar low-level operation. In the following examples and explanations, method handles will be described in terms of functionality present in MethodHandles as presented in Java, such as those described in the Java Language Specification, Java SE 8 Edition and the Java Virtual Machine Specification Java SE 8 Edition, both of which are hereby incorporated by reference as though fully stated herein. However, there is no requirement that an embodiment implement a method handle with all the features found in Java's implementation of MethodHandles. At a minimum, a method handle represents an object or other program element that can be "invoked" to cause the method code to which the method handle is bound to execute.

In some embodiments, the import mechanism allows new hardware intrinsics to be utilized by writing or updating a library of source code, rather than specifically modifying the virtual machine for each new intrinsic. Thus, once the architecture is in place to allow the import mechanism to function, the virtual machine itself (e.g. the code which implements the virtual machine) no longer needs to be modified in order to allow new intrinsics to be utilized by end user programmers. Using Java as an example, once the JVM has been updated to include the new import mechanism, new intrinsics can be imported into the virtual machine environment by writing or updating Java files and/or libraries to define one or more methods that grant access to the hardware intrinsic. This provides multiple benefits in that source code is typically more convenient to write than the language used to implement the virtual machine and the risk of miscoding the virtual machine is minimized when introducing new intrinsics.

In an embodiment, in order to provide access to a new hardware intrinsic, a source code file is generated which defines a method for accessing the hardware intrinsic. Although the term "source code file" will be used as an example, the method may in fact be defined in multiple files or within a code library, such as a .jar file in Java. The method is defined within the source code file by a name and a type. The type of a method is specified by the argument and return types. For example, assuming the existence of a hardware intrinsic that counts the number of leading zeros in an integer, the method may be defined, using Java syntax as an example, as public static int countLeadingZeros(int a), where countLeadingZeros is the name and the type indicates the method takes an int as an argument and returns an int. In addition, the source code file provides logic that indicates an implementation to which to tie calls to the method depending on the capabilities of the underlying hardware platform. This may take the form of an initializer for the class encapsulating the method which binds the call to a hardware specific implementation. For example, the body of countLeadingZeros may invoke a method handle which is initialized by sensing the underlying platform and branching on the sensed platform, where each branch binds the method handle to a respective platform specific implementation. For instance, the virtual machine may supply various methods which return platform-specific information on which to branch, such as Boolean values indicating whether or not the underlying hardware implements certain features of the type/model of the underlying hardware.

In some embodiments, to ensure cross compatibility between platforms, the method also includes a "catch all" branch that provides a software implemented version of the intrinsic for platforms which do not natively support the intrinsic. The software implemented version may coble together the effect of the intrinsic using other instructions supported by the underlying hardware to ensure compatibility, but the execution of the "intrinsic" will likely be less efficient than those systems which natively support the intrinsic.

In an embodiment, to bind the method handle to a particular implementation, a virtual machine implemented method (referred to herein as the "make intrinsic method") is invoked which, at a minimum, takes as input the machine code which emits the instruction that causes the underlying hardware to execute the intrinsic and returns a method handle which, when invoked, causes the machine code to execute. Depending on the embodiment, the machine code may be specified by providing the bytes of the machine code or may be provided as "symbolic" code which is processed by an assembler into machine code when generating the method handle. However, in some embodiments, the make intrinsic method takes additional information as input.

Since the make intrinsic method requires support from the virtual machine, the goal is to devise a make intrinsic method that could be applied generally across any kind of hardware intrinsic to avoid the need to modify the virtual machine itself when importing new intrinsics. In some embodiments, the make intrinsic method takes a name of the intrinsic as input, which can be used for diagnostic purposes, such as appearing in a stack trace by the specified name. In some embodiments, the make intrinsic method takes as input the type of the method (the argument and return types). Since the make intrinsic method is generic across hardware intrinsics, the argument and return types specifies to the virtual machine the shape of the call to which the method handle will be bound and allows type safety checks to be performed.

In some embodiments, the make intrinsic function also takes as input a set of bindings that indicates how the argument types and return types map to specific memory constructs, such as registers. As mentioned earlier, different CPU manufacturers adhere to different calling conventions, which can differ in many factors such as: where arguments, return values, and return addresses are placed (in registers, on the stack, a mix of both, or in other memory structures), the order in which the arguments are passed, how return values are delivered back to the caller (on the stack, in a register, within the heap), how the task of cleaning up for and cleaning up after a function call is divided between the caller and the callee, how metadata describing the arguments and/or return types is to be passed, which registers must be returned to their initial states after the call, and so forth. Depending on the embodiment, the bindings may be specified directly (e.g. first argument→register 1, second argument→register 2, etc.), symbolically (e.g. integer arguments go into the first available register of storage class A), or by specifying a particular calling convention (e.g. use the metadata for calling convention x86-32 bit, which is pre-programmed with the calling convention used for x86-32 bit processors). In such embodiments, the method handle generated by the make intrinsic function is bound not only to the specified machine instructions, but also special "adapter" code which is responsible for populating memory structures with the arguments before executing the machine code according to the bindings and, after execution, retrieving the return value(s) from one or more memory structures according to the bindings. For example, the adapter code may pop one or more argument values off of an operand stack within the current stack frame, place those argument values into one or more argument registers according to the bindings, execute the machine code, and then push one or more return values from one or more return registers back onto the operand stack.

In some embodiments, due to the inherently unsafe nature of allowing user code to cause execution of arbitrary machine code, the make intrinsic method is limited to privileged code sources. For example, the make intrinsic method may be set with access permissions which only allow the method to be called by code which is written by the developer or another trusted party. However, once written, the method which provides access to the hardware intrinsic can be accessed by user-level source code without the same security concerns. For example, the developers may write an "intrinsic library" which specifies the method definitions which provide access to a wide array of hardware intrinsics. Furthermore, once the virtual machine has been adapted to implement a make intrinsic method, new intrinsics can be supported merely by adding a new source file to the library or modifying an existing source file within the library to define a new method and provide an implementation for initializing variables (such as a method handle) within said method.

As additional benefits, the technique described above allows an end-user programmer to program code without having to write code specific to any particular platform. Instead, the cross-compatibility is covered by the initialization of the class housing the method providing access to the intrinsic. In addition, the sensing of the underlying platform and the branching based on the sensed platform only has to be performed once at initialization. After that time the method handle is bound to the proper implementation and can be called directly without performing the aforementioned pre-processing steps. Furthermore, once initialized, the call to the method handle remains constant throughout the remainder of the run-time. As a result, a compiler, such as a JIT compiler, can efficiently optimize code by inlining the instructions bound to the method handle within the calling method.

2.0 Example Operating Architecture

FIG. 1 illustrates an example computing architecture 100 in which techniques described herein may be practiced.

As illustrated in FIG. 1, a computing architecture 100 includes source code files 101 which are compiled by a compiler 102 into class files 103 representing the program to be executed. The class files 103 are then loaded and executed by an execution platform 112, which includes a run-time environment 113, an operating system 111, and one or more application programming interfaces (APIs) 110 that enable communication between the run-time environment 113 and the operating system 111. The run-time environment 113 includes a virtual machine 104 comprising various components, such as a memory manager 105 (which may include a garbage collector), a verifier 106 to check the validity of the class files 103 and method instructions, a class loader 107 to locate and build in-memory representations of classes, an interpreter 108 for executing the virtual machine 104 code, a just-in-time (JIT) compiler 109 for producing optimized machine-level code, and a link resolver 114 for resolving symbolic references to classes and/or methods.

In an embodiment, the computing architecture 100 includes source code files 101 that contain code written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpass a threshold (is "hot"), the virtual machine 104 invokes the JIT compiler 109 to perform an analysis of the block and generate optimized machine-level instructions which replaces the "hot" block of code for future executions. Since programs tend to spend most of their time executing a small portion of their overall code, compiling just the "hot" portions of the program can provide similar performance to fully compiled code, but without the start-up penalty.

In order to provide clear examples, the source code files 101 have been illustrated as the "top level" representation of the program to be executed by the execution platform 111. However, although the computing architecture 100 depicts the source code files 101 as a "top level" program representation, in other embodiments the source code files 101 may be an intermediate representation received via a "higher level" compiler that processed code files in a different language into the language of the source code files 101. In order to illustrate clear examples, the following disclosure assumes that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, Chapter 4 of the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion will assume that each of the class files 103 represents a respective "class" defined in the source code files 101 (or dynamically generated by the compiler 102 and/or virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
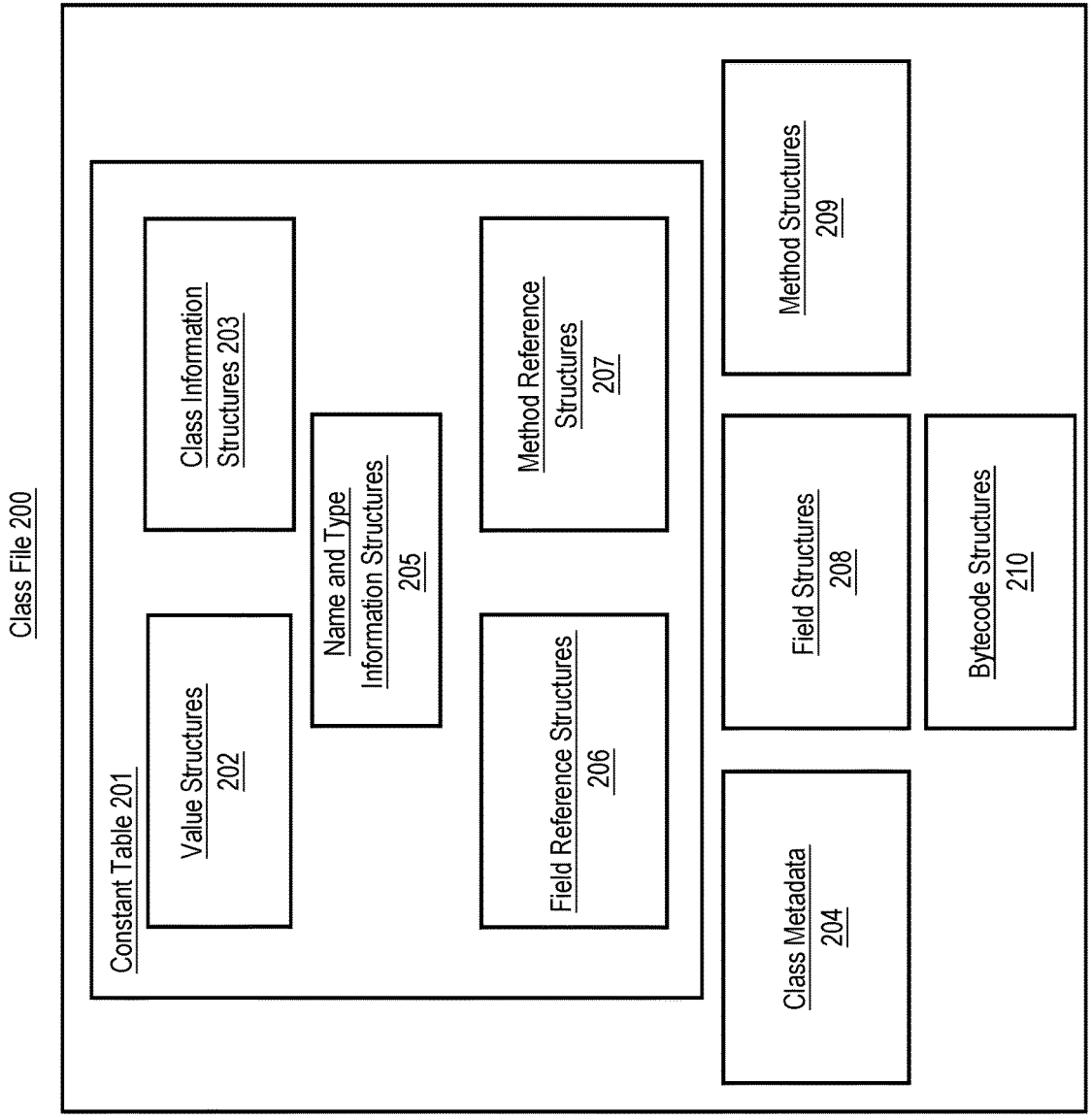
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 204, method structures 209, and code structures 210.

In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 205, field reference structures 206, and method reference structures 207 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 206 of the constant table 201 hold an index into the constant table 201 to one of the class information structures 203 representing the class defining the field and an index into the constant table 201 to one of the name and type information structures 205 that provides the name and descriptor of the field. Method reference structures 207 of the constant table 201 hold an index into the constant table 201 to one of the class information structures 203 representing the class defining the method and an index into the constant table 201 to one of the name and type information structures 205 that provides the name and descriptor for the method. The class information structures 203 hold an index into the constant table 201 to one of the value structures 202 holding the name of the associated class. The name and type information structures 205 hold an index into the constant table 201 to one of the value structures 202 storing the name of the field/method and an index into the constant table 201 to one of the value structures 202 storing the descriptor.

In an embodiment, class metadata 204 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and references to which of the method structures 209 holds the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201.

Using Java as an example, consider the following class

```
class A
{
int add12and13( ) {
    return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the run-time environment 113. As will be described in Section 2.3, eventually the run-time representation of the symbolic references are resolved into actual memory addresses by the virtual machine 104 after the referenced classes (and associated structures) have been loaded into the run-time environment and allocated concrete memory locations.

2.2 Example Virtual Machine Architecture

Figure 3:
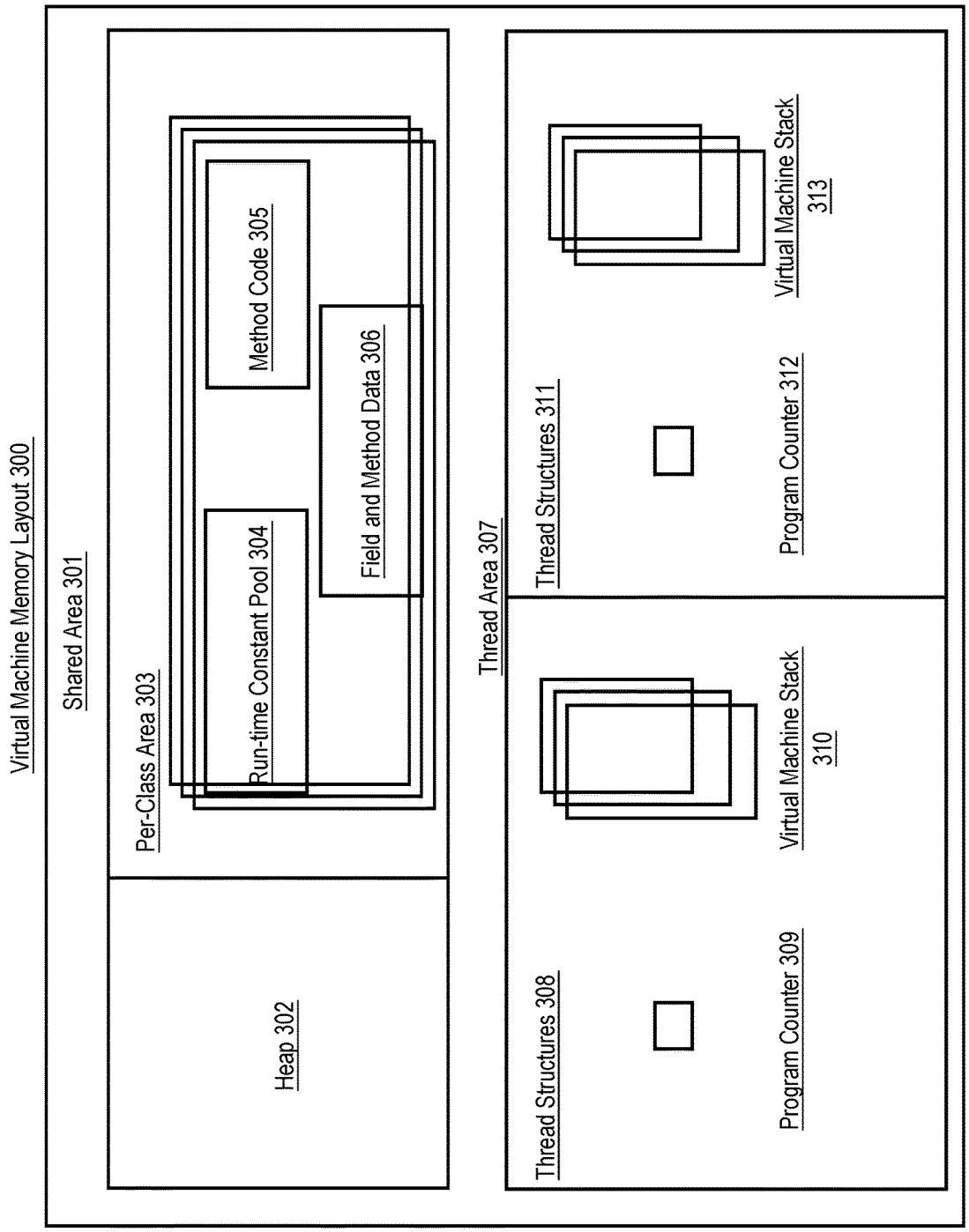
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307.

The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads. Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread. When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
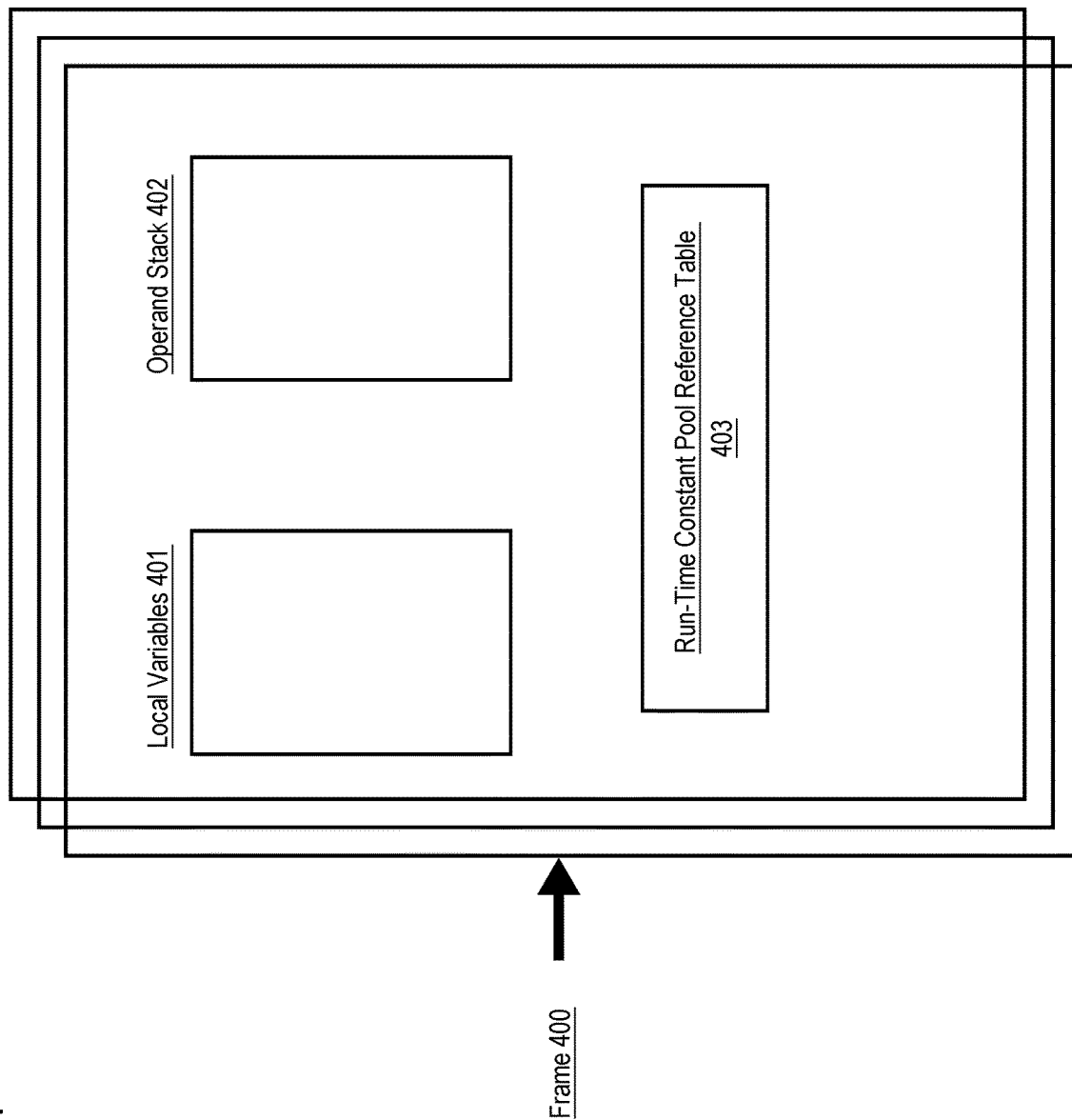
FIG. 4 illustrates an example stack frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403.

In an embodiment, the local variables 401 are represented as an array of variables that each hold a value, such as Boolean, byte, char, short, int, float, reference, and so forth. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1–N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

Although the local variables 401 and the operand stack 402 are referred to using data structures such as "arrays" and/or "stacks", there is no limit to the type of data structure used to implement those elements. In addition, the data structures referred to herein with respect to the local variables 401 and operand stack 402 relate to high level representations of the data structure. Embodiments can implement those data structures using a variety of lower level storage mechanisms, such as storing one or more values of the local variables 401 and/or the operand stack 402 in one or more registers of a central processing unit (CPU) of the machine hardware executing the virtual machine 104.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the run-time environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the referred method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then passes control to the link resolver 114 which replaces the symbolic references with a reference to the concrete memory location of the referenced class, field, or method. For example, the link resolver 114 may consult metadata, tables, or other information to search and locate the concrete memory location. In an embodiment, the link resolver 114 caches resolutions to be reused in case the same class/name/descriptor is encountered again during execution of the program. In some embodiments, caching is performed by replacing the symbolic reference within the run-time constant pool 304 of the class. However, in other embodiments, a separate caching data structure is used to store pointers to the concrete memory location.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3.0 Source Code Representation

In this section examples are provided for how to define and implement a method which provides access to a hardware intrinsic. The following explanations make use of pseudocode which is written using syntax that is similar to that of the Java language. However, the pseudocode is provided only to clarify the examples and is not intended to limit the described techniques to any particular language. In addition, the techniques are described in relation to a "source code file", which is assumed to be one of the source code files 101 described above. There is no requirement that the source code file is written in any particular language, but in most cases will be the language expected by the compiler 102 for translation into class files 103. Otherwise, a separate compiler may be required to convert the source code file into the class file format expected by the virtual machine 104. In some embodiments, the source code file is part of a library of methods for providing access to hardware intrinsics. For example, in Java the library may take the form of a .jar file.

In an embodiment, a source code file is generated which defines a method that provides access to a hardware intrinsic. The definition of the method is provided by the name of the method and the type of the method. The type of the method is specified by the argument types defining the argument values that the method takes as input and the return types of the return values that the method generates as output. For example, in the case of an intrinsic which counts the number of leading zeros, the method may be defined as, public static int countLeadingZeros(int a)

where countLeadingZeros is the name and the type indicates the method takes an int as an argument and returns an int. In the above example, public is a keyword which controls access to the method, which in this case is publically available to all calling classes. In addition, static is a keyword indicating that the method is not tied to any particular instance of the encapsulating class. Thus, for example, if the encapsulating class is called Intrinsics, a calling class could invoke the method using Intrinsics.countLeadingZeros(b), assuming b is of type int, without creating a separate instance of the class. The exact format used to define the method is not critical. For example, there is no requirement that the method be public or static. Furthermore, other practical examples may include methods for intrinsics which take multiple (or no) arguments as inputs and return multiple (or no) values as output. However, to provide clear examples, the countLeadingZeros method defined above will be used as a continuing example to clarify the techniques described herein.

In an embodiment, in addition to the method definition, the source code file includes a definition for the body of the method. For example, the body may be given by the following pseudocode:

```
public class Intrinsics {
    static final MethodHandle mhCountLeadingZeros;
    public static int countLeadingZeros(int a) {
        return (int)mhCountLeadingZeros.invokeExact(a);
    }
    ...
``` where Intrinsics represents the class encapsulating the method, mhCountLeadingZeros is a method handle which (as described later) is bound to a platform-specific implementation of the hardware intrinsic, and return (int)mhCountLeadingZeros.invokeExact(a) invokes the method handle mhCountLeadingZeros with the integer argument a and returns the result to the caller.

In an embodiment, the source code file also includes an initializer for the class Intrinsics which determines the platform that the virtual machine 104 is currently executing on and, based on the platform, determines the machine code should be used to generate the method handle for mhCountLeadingZeros. For example, the initialization may be performed using the following pseudocode:

```
static {
    if(supports_bmi( )) {
        mhCountLeadingZeroes = Unsafe.makeIntrinsic(
            "lzcnt",
            MethodType.methodType(int.class, int.class),
            0xF3, 0x0F, 0xBD, 0xF8); // lzcnt %eax,%edi
    } else {
        mhCountLeadingZeroes = Lookup.lookup( ).
        findStatic(PortableLibrary.class, "countLeadingZeroes",
        MethodType.methodType(int.class, int.class));
    }
}
```

In the pseudocode above, supports_bmi( ) is a method which returns true if the underlying hardware supports bit manipulation instructions (such as counting leading zeros). Other types of branching on sensed capabilities is also possible, such as returning a string, integer, or other identifier of the underlying hardware and performing a branch based on the identifier. For example, a switch statement may be performed over known platform types, or libraries of platform-specific helper bytecodes may be dynamically selected and loaded. In some embodiments, platform sensing methods are supported by the virtual machine 104 and work based on platform sensing performed by the virtual machine 104 on startup. For example, upon the virtual machine 104 beginning execution, an initial sensing may be performed that store the capabilities and/or type/model of the underlying hardware in memory, such as global variables, that can then be accessed through provided platform sensing methods, such as the supports_bmi( ) example above.

In the example pseudocode above, if the underlying hardware natively supports bit manipulation instructions, a call is made to Unsafe.makeIntrinsic, which is a method that, when executed, generates a method handle based on a specified name, method type, bindings, and/or machine code. For clarity, Unsafe.makeIntrinsic is referred to herein as an example of a "make intrinsic" method. However, not all embodiments will implement a make intrinsic method which utilizes all the aforementioned inputs. For example, the pseudocode above assumes that the make intrinsic method does not take bindings as an input. In some embodiments, the virtual machine 104 may implement multiple versions of the make intrinsic method for various combinations of the inputs described below.

In an embodiment, the make intrinsic method takes as input the machine code which emits the instruction which causes the underlying hardware to execute the intrinsic and returns a method handle which, when invoked, causes the machine code to execute. Depending on the embodiment, the machine code may be specified by providing the bytes of the machine code directly or may be provided as "symbolic" code which is processed by an assembler into machine code when generating the method handle. In some embodiments, the make intrinsic method may take as input a reference to a specific assembler to use to assemble the code, or may be wrapped in another method which is bound to a specific assembler and takes as input one or more of the inputs of the make intrinsic method and a reference to the make intrinsic method. The end result is, upon execution, the assembler processes the "symbolic" machine code to produce machine code understandable by the underlying hardware platform and the resultant machine code is then packaged into a method handle.

In some embodiments, the make intrinsic method takes a name of the intrinsic as input, which can be used for diagnostic purposes, such as appearing in a stack trace by the specified name. However, from a functional standpoint, the name is not required since the method handle does not need to be referenced directly by the ultimate caller.

In some embodiments, the make intrinsic method takes as input the type of the method (the argument and return types). Since the make intrinsic method is generic across hardware intrinsics, the argument and return types specify to the virtual machine the shape of the call to which the method handle will be bound. In some cases, providing the method types also allows the virtual machine 104 to perform type safety checks by comparing the types of arguments and returns used to execute the method handle to the types to which the method handle was bound at creation. If the types do not match, an error may be thrown indicating a type mismatch.

In some embodiments, the make intrinsic function also takes as input a set of bindings that indicates how the argument types and return types map to specific memory constructs, such as registers. As mentioned earlier, different CPU manufacturers adhere to different calling conventions, which can differ in many factors such as: where arguments, return values, and return addresses are placed (in registers, on the stack, a mix of both, or in other memory structures), the order in which the arguments are passed, how return values are delivered back to the caller (on the stack, in a register, within the heap), how the task of cleaning up for and cleaning up after a function call is divided between the caller and the callee, how metadata describing the arguments and/or return types is to be passed, which registers must be returned to their initial states after the call, and so forth. Depending on the embodiment, the bindings may be specified directly (e.g. first argument→register 1, second argument→register 2, etc.), symbolically (e.g. integer arguments go into the first available register of storage class A), or by specifying a particular calling convention (e.g. use the metadata for calling convention x86-32 bit, which is pre-programmed with the calling convention used for x86-32 bit processors). In some cases, such as the example above, specifying the bindings can be omitted completely. In such cases, the virtual machine 104 keeps track of metadata defining the bindings for the platform upon which the virtual machine 104 is currently executing and implicitly assumes that the make intrinsic function uses those bindings. For example, this metadata defining the bindings may be populated upon startup of the virtual machine 104 when initial platform sensing is performed.

In some embodiments, the method handle generated by the make intrinsic function is bound not only to the specified machine instructions, but also special "adapter" code which is responsible for populating memory structures with the arguments before executing the machine code according to the bindings and, after execution, retrieving the return value(s) from one or more memory structures according to the bindings. For example, the adapter code may pop one or more argument values off of the operand stack 402 within the current stack frame 400, place those argument values into one or more argument registers according to the bindings, execute the machine code, and then push one or more return values from one or more return registers back onto the operand stack 402. However, the exact steps performed before and after execution depend on the calling convention of the hardware intrinsic and the argument/return types of the hardware intrinsic. For example, if the return type is void, there may not be need for adapter code that, after execution of the machine code, moves the return value from a return register back onto the operand stack 402.

In the above pseudocode, the block after the else statement is catchall logic which is intended to cover platforms which do not natively support the hardware intrinsic. In this case, a method handle is created to a software-implemented version of the functionality that would otherwise be provided by the hardware intrinsic. In this case, the functionality is provided by the countLeadingZeros implementation provided by the PortableLibrary class as specified by the lookup call.

In the above example, only two branches (the check binary manipulation instructions branch and the catchall branch) are shown. However, in a practical environment, there may be many more branches. For example, there may be one branch for each model of CPU that is currently known to the developers of the virtual machine 104, where each branch uses machine code specific to the model of the CPU. Thus, the pseudocode above provides a simplified example of the branching structure, rather than an example of how a "typical" branching structure may appear in a practice.

4.0 Executing a Hardware Intrinsic

Figure 5:
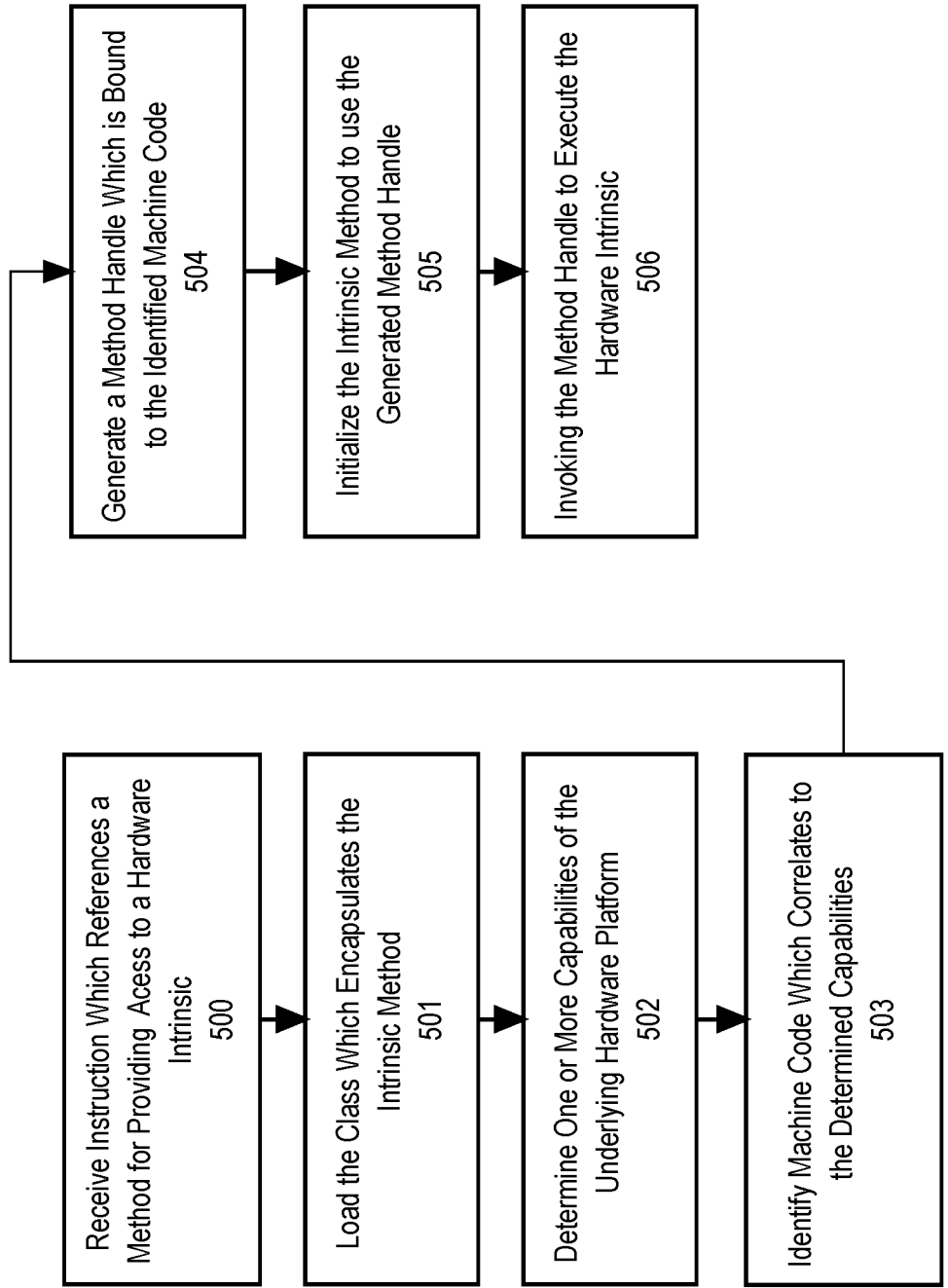
FIG. 5 illustrates a process for executing a hardware intrinsic in block diagram form according to an embodiment.

FIG. 5 is a block diagram that illustrates executing a hardware intrinsic in block diagram form according to an embodiment. FIG. 5 presents blocks in a specific order, however there is no requirement that all embodiments must adhere to the specific order illustrated in FIG. 5. For example, other embodiments may divide out blocks, add blocks, remove blocks, or combine blocks compared to the block diagram of FIG. 5. For brevity, the method which provides access to a hardware intrinsic is referred to as the "intrinsic method". The following explanation assumes that the virtual machine 104 performs the steps illustrated in FIG. 5.

At block 500, the virtual machine 104 receives an instruction which references a method for providing access to a hardware intrinsic. To provide clear examples, the class which contains the instruction invocating the intrinsic method is referred to as the calling class and the class encapsulating the intrinsic method is referred to as the called class. In an embodiment, the virtual machine 104 receives the instruction as a bytecode contained within the class file of the calling class. For example, in an embodiment, the source code files 101 which contain the calling class and the called class are compiled by the compiler 102 into members of the class files 103. The calling class, as described above in Section 2.1 contains an invocation instruction which references one of the method reference structures 207 of the constant table 201 which in turn provides the name and type of the intrinsic method being called. The called class contains a member of the method structures 209 in its class file which contains the definition of the intrinsic method and provides a reference into the bytecodes of the intrinsic method contained within the class file of the called class.

The manner in which the instruction is received depends on whether the virtual machine 104 is operating in an interpretive mode or a compiled mode. If the virtual machine 104 is operating in an interpretive mode, the instruction is received by the interpreter 108 and executed. If the virtual machine 104 is operating in a compiled mode, the instruction is received by the JIT compiler 109 as part of a package or set of instructions that is to be optimized and compiled down to machine code for execution.

At block 501, the virtual machine 104 loads the class encapsulating the intrinsic method. In an embodiment, the called class (if not already loaded) is loaded into the virtual machine memory layout 300 within the run-time environment 113 of the virtual machine 104. For example, the called class may be loaded as described above in Section 2.3. In some embodiments, upon being loaded, the virtual machine 104 initializes the called class by executing an initializer method. In some embodiments, blocks 502-505 represent steps performed by the initializer method.

At block 502, the virtual machine 104 determines one or more capabilities of the underlying hardware platform. In an embodiment, the virtual machine 104 determines one or more capabilities of the underlying hardware platform by executing methods which are configured to return characteristics of the underlying hardware, such as type, model, year, version, individual capabilities of the underlying hardware, and so forth. However, in some embodiments, the aforementioned characteristics may be stored in global or other variables which can be retrieved by the initializer method.

At block 503, the virtual machine 104 identifies machine code which correlates to the determined capabilities of the underlying hardware platform. In an embodiment, the virtual machine 104 performs a branching operation based on the one or more capabilities determined at block 502. For example, the branching may be performed using a switch, if/else, or any other kind of logic which allows different paths to be taken depending on the determined capabilities of the underlying hardware. In an embodiment, each branch is bound to machine code that is to be emitted to cause the underlying hardware to perform the intrinsic, with the exception of the catchall block which is bound to a software implementation of the intrinsic. In some embodiments, in addition to identifying the machine code, the virtual machine 104 also identifies bindings for the intrinsic, a name for the intrinsic, and/or a type of the intrinsic (as defined by the argument and return types of the intrinsic). Additional details regarding the bindings, name, and type are provided above in Section 3.0.

At block 504, the virtual machine 104 generates a method handle which is bound to the identified machine code. In an embodiment, the intrinsic method calls a make intrinsic method which is supplied with the machine code, name, type, and/or bindings identified at block 504. The following explanation assumes the bindings are provided. However, as discussed above in Section 3.0, the bindings may be inferred based on the current hardware platform upon which the virtual machine 104 is executing and therefore does not have to be explicitly provided at block 503. In an embodiment, the make intrinsic method analyzes the bindings and determines which registers (or other memory constructs such as space on the stack or heap) the arguments need to be packaged into before executing the hardware intrinsic.

In an embodiment, the make intrinsic method, itself or through use of an adapter component, pops the arguments off of the operand stack 402 and generates the machine code instructions which place those arguments into the appropriate memory constructs. In some cases, depending on the calling convention of the hardware intrinsic, the arguments may need to be repackaged in another form, such as boxing or unboxing certain types. In addition, in some cases, the current contents of the registers may need to be saved to memory and restored when the machine code which emits the hardware intrinsic instruction has finished executed. After the machine instructions for populating the memory constructs with the arguments, the make intrinsic method generates the specified machine code for the intrinsic. In some embodiments, the machine code is directly taken from the machine code identified at block 503. However, in the case where all or part of the machine code is "symbolic", the make intrinsic method may pass the "symbolic" machine code to an assembler which processes the symbolic machine code into actual machine code instructions. After the machine code for executing the intrinsic is generated, the make intrinsic method generates machine code which retrieves the return value(s) (e.g. from one or more return registers or other memory constructs) and pushes the return value(s) back onto the operand stack 402. In some embodiments, depending on the bindings, the return value(s) may be packaged or unpackaged during the return. For example, rather than pushing the return by value onto the operand stack 402, the return may be stored elsewhere, such as on the heap 302, with a reference to the return pushed onto the operand stack 402. The above explanation assumes that the intrinsic requires both arguments and a return value. However, in some cases, the return type may be void or the intrinsic may take no arguments. In such cases, the machine code that packages the arguments or the return values may be respectively omitted.

In some embodiments, the pre and post execution processing for the argument and return types emits assembly code, rather than machine instructions. Thus, in some embodiments, the entire set of instructions are passed to the assembler for transformation into machine code.

Once the machine instructions are generated by the make intrinsic method, the machine code is stored in memory and a method handle is generated which is bound to that memory location. The exact location used to store the instructions is not critical and may, for example, be within the heap 302 or the per-class area 303 of the called class. The binding of the method handle to the machine instructions ensures that when the method handle is invoked, the invocation causes the virtual machine 104 to execute the machine code to which the method handle is bound.

At block 505, the virtual machine 104 initializes the intrinsic method to use the generated method handle. In an embodiment, the make intrinsic method returns a method handle which is bound to the machine code generated during block 504. The method handle referenced by the intrinsic method is then set to reference the method handle generated at block 504. As a result, once initialized, the intrinsic method is set to invoke the method handle generated at block 504 from that point forward and the steps represented in blocks 501-504 do not need to be performed for future invocations of the intrinsic method. Instead, upon receiving an invocation instruction at block 500, the virtual machine 104 can immediately use the already initialized method handler to proceed directly to block 506.

At block 506, the virtual machine 104 invokes the method handle to execute the hardware intrinsic. In an embodiment, the virtual machine 104 invokes the method handle, which in turn causes the virtual machine 104 to emit the hardware instruction appropriate to the underlying hardware platform and also perform the pre and post execution processing required by the calling convention of the hardware intrinsic.

However, in some cases, such as when FIG. 5 is being performed by the JIT compiler 109, instead of invoking the method handle, the virtual machine 104 may instead perform optimizations on a set of instructions which include the method handle invocation. The most common (and oftentimes most effective form) of optimization is inlining, in which a method call is replaced with the instructions that the called method would otherwise perform. This removes a layer of indirection and saves processing time by omitting a jump or other instruction that would be needed to reach the called method's instructions for execution. Thus, in some embodiments, while running the JIT compiler 109, inlining can be performed by replacing the invocation of the method handle with the direct machine instructions the method handle would cause to execute. After inlining, if the intrinsic symbolically binds argument and return registers to storage classes (instead of single fixed registers), the compiler may choose a previously unused register for an argument or return value, thereby avoiding register conflicts and spills to stack. As a result, in such cases, block 506 may be performed by executing the machine instructs as a result of compilation without necessarily executing the hardware intrinsic through invocation of the method handle.

5.0 Enhanced Make Intrinsic Methods

As mentioned above, the make intrinsic method which produces the method handle bound to the machine code for invoking the intrinsic takes inputs such as the name of the intrinsic (for diagnostic purposes), the type of the intrinsic (input and output types), and the machine code which invokes the intrinsic. Thus, when the program is executed by the interpreter 108 invocations of the method handle causes the machine code to be executed. Similarly, when the program is compiled, such as by the JIT compiler 109, invocations of the method handle are effectively replaced during in-lining with the machine code to which the method handle was bound. However, in some embodiments, additional inputs are provided to the make intrinsic method which allows more efficient machine code to be generated by the JIT compiler 109.

In some embodiments, the API of the make intrinsic method is extended to allow a register mask to be specified (which indicates which registers or types of registers are allowed to be used for the intrinsic) and callback code that can be used to generate machine code instructions based on JIT-compiler decisions. For example, compilers during register allocation often perform a "liveness" analysis of the code to determine which sets of variables are live at the same time, constructs a graph representing the relationships between the variables, and then performs graph coloring to determine optimal register allocations for the code being compiled. Thus, which exact registers are used for the intrinsic may differ depending on a more global analysis of the code. Thus, binding the method handle to generator/adapter code which takes as input the registers that the JIT compiler 109 intends to use and then automatically generates machine code which uses those registers allows for more efficient machine code to be generated. Otherwise if the same registers used by the machine instructions are already in use, the virtual machine 104 may have to perform additional swaps between registers and memory in order execute the machine code of the intrinsic. One motivation for the technique is to minimize explicit moves of arguments in the generated code. As a result, the register allocator is fed decisions into the callback and lets the callback decide what machine code to produce. When a user describes an intrinsic, the user can express some constraints (what set of registers can be used for an argument) and the register allocator satisfies those constraints.

In some embodiments, an enhanced make intrinsic method allows a generator to be specified which the JIT compiler 109 can call when the machine code bound to the generated method handle is to be inserted into the compiled code. For example, consider the following example pseudo-code for a make intrinsic method:

```
Private static MethodHandle MHm256_vaddps =
Unsafe.makeIntrinsic("mm256_add_ps",
MethodType.methodType(Long2.class,
Long2.class, Long2.class), requires(AVX),
new Register[ ][ ]{xmmRegoster SSE, xmmRegoster SSE,
xmmRegostersSSE},
(Register[ ] regs) -> {
Register out= regs[0];
Register in1=regs[1];
Register in2=regs[2];
int [ ] vex = ... //generate machine code depending on in1, in2, and out registers
}
```

In the example above, Unsafe.makeIntrinsic is the make intrinsic method which receives as input (1) the name of the intrinsic "mm256_add_ps", (2) the type of the method, which in this case takes two longs as input and returns a long as output, (3) criteria specifying the capabilities that the underlying execution platform 112 requires to utilize the intrinsic, (4) register masks for input and output values that specify which registers can be utilized when executing the intrinsic, and (5) callback code which generates machine code according to JIT compiler 109 decisions, such as which registers will be used to execute the intrinsic. During the register allocating phase of the JIT compiler 109 the JIT compiler 109 chooses appropriate values for the three registers specified above and passes those registers into the callback code (as Register[ ]). The callback returns machine code which the JIT compiler 109 injects into the generated compiled code. In some embodiments the hardware capability of platform is passed to the Unsafe.makeIntrinsic method by use of a hardware capability id (e.g. "AVX" as specifying advanced vector extensions supported hardware). In some embodiments, the Unsafe.makeIntrinsic method has a Boolean flag to produce a method handle which always throws an exception when the flag is false (the underlying hardware does not have the capability). In such embodiments, this is used as a safety net instead of crashing the virtual machine 104, if there is a missing case (e.g. no implementation for non-AVX platforms provided), a default implementation may be provided which throws an exception.

6.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a light emitting diode (LED) display, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

7.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

8.0 First Additional Disclosure

Aspects of the subject matter described herein are set out in the following numbered clauses:

1. A method comprising: a virtual machine receiving metadata describing one or more entries supporting a set of instructions, wherein the metadata includes a definition of a function for accessing a hardware intrinsic, wherein the definition of the function includes a name of the function and a type of the function, wherein the type of the function specifies a set of argument types for the function and a set of return types for the function, wherein the set of instructions includes a first set of instructions which implements the function for accessing the hardware intrinsic and which, when executed, causes invocation of a particular function reference; the virtual machine receiving an instruction that specifies to invoke the function for accessing the hardware intrinsic; the virtual machine determining one or more characteristics of a hardware platform upon which the virtual machine is executing; the virtual machine selecting, based on the one or more characteristics of the hardware platform, one or more items related to the hardware intrinsic, wherein the one or more items includes at least a set of machine instructions which, when executed, causes the hardware platform to perform the hardware intrinsic; the virtual machine generating a second set of instructions based on the one or more items related to the hardware intrinsic; the virtual machine binding the particular function reference to the second set of instructions such that invocation of the particular function reference causes execution of the second set of instructions; the virtual machine executing the first set of instructions.

2. The method of Clause 1, wherein the one or more items related to the hardware intrinsic include one or more of: a name for the hardware intrinsic, a set of argument types for the hardware intrinsic, a set of return types for the hardware intrinsic, one or more bindings that indicate one or more memory constructs in which to store a set of values corresponding to the set of argument types for the hardware intrinsic prior to the hardware platform performing the hardware intrinsic, or one or more bindings that indicate one or more memory constructs from which to retrieve one or more values corresponding to the set of return types for the hardware intrinsic after the hardware platform performs the hardware intrinsic.

3. The method of any of Clauses 1-2, wherein generating the second set of instructions includes: generating a third set of instructions which, when executed, causes the hardware platform to perform the hardware intrinsic, and one or more of: generating a fourth set of instructions which, when executed, places a set of values corresponding to the set of argument types for the function into one or more memory constructs based on a first set of bindings associated with the hardware intrinsic and including the fourth set of instructions in the second set of instructions such that the fourth set of instructions executes prior to the third set of instructions, or generating a fifth set of instructions which, when executed, retrieves a second set of values corresponding to the set of return types for the function from a second set of memory constructs based on a second set of bindings associated with the hardware intrinsic and including the fifth set of instructions in the second set of instructions such that the third set of instructions executes after the third set of instructions.

4. The method of Clause 3, wherein the one or more memory constructs include one or more of: a set of registers, a stack within a stack frame, or a heap.

5. The method of any of Clauses 1-4, wherein the function for accessing the hardware intrinsic and first set of instructions are received as part of a class file for a particular class.

6. The method of any of Clauses 1-5, wherein the definition of the function and the first set of instructions represent source code that has been compiled by a compiler into an intermediate form.

7. The method of any of Clause 6, wherein the source code adheres to Java language and the intermediate form represents a class file that includes the metadata and the first set of instructions, wherein the first set of instructions are one or more bytecode instructions.

8. The method of any of Clauses 1-7, wherein the set of machine instructions includes symbolic machine code and generating the second set of instructions includes sending the symbolic machine code to an assembler to generate one or more actual machine code instructions to include within the second set of instructions.

9. The method of any of Clauses 1-8, wherein the hardware intrinsic represents functionality that is natively implemented by the hardware platform.

10. The method of any of Clauses 1-9, wherein the virtual machine, when selecting the one or more items related to the hardware intrinsic, selects the set of machine instructions from one or more code options which include a code option which, when executed, causes the virtual machine to execute a software implemented version of functionality provided by the hardware intrinsic, wherein the code option is configured to be selected in cases where the hardware platform does not natively support the hardware intrinsic.

11. The method of any of Clauses 1-11, wherein the one or more items includes a third set of instructions which generates machine code for the hardware intrinsic based on one or more just-in-time (JIT) compiler decisions and further comprising: compiling the first set of instructions using a JIT compiler by executing the third set of instructions to generate a set of machine code and in-lining the particular function reference by replacing the particular function reference with the set of machine code.

12. One or more non-transitory computer-readable media storing instructions that, when executed by one or more computing devices, causes performance of any one of the methods recited in Clauses 1-11.

13. A system comprising one or more computing devices comprising components, implemented at least partially by computing hardware, configured to implement the steps of any one of the methods recited in Clauses 1-11.

What is claimed is:

1. A method comprising:
a virtual machine receiving metadata describing one or more elements supporting a set of instructions, wherein the metadata includes a definition of a function for accessing a hardware intrinsic that implements a particular feature, wherein the definition of the function includes a name of the function and a type of the function, wherein the type of the function specifies a set of argument types for the function and a set of return types for the function, wherein the set of instructions includes a first set of instructions which implements the function for accessing the hardware intrinsic and which, when executed, causes invocation of a particular function reference;
the virtual machine receiving an instruction that specifies to invoke the function for accessing the hardware intrinsic;
the virtual machine dynamically:
detecting whether a hardware platform upon which the virtual machine is executing supports the particular feature, and
selecting, based on said whether the hardware platform supports the particular feature, a second set of instructions from:
a set of machine instructions which, when executed, causes the hardware platform to perform the hardware intrinsic, and
a set of machine instructions which provide a software implemented version of functionality provided by the hardware intrinsic;
after said selecting said second set of instructions, the virtual machine binding the particular function reference to the second set of instructions such that invocation of the particular function reference causes execution of the second set of instructions;
the virtual machine executing said set of instructions, including the first set of instructions.

2. The method of claim 1, wherein one or more items related to the hardware intrinsic include one or more of: a name for the hardware intrinsic, a set of argument types for the hardware intrinsic, a set of return types for the hardware intrinsic, one or more bindings that indicate one or more memory constructs in which to store a set of values corresponding to the set of argument types for the hardware intrinsic prior to the hardware platform performing the hardware intrinsic, or one or more bindings that indicate one or more memory constructs from which to retrieve one or more values corresponding to the set of return types for the hardware intrinsic after the hardware platform performs the hardware intrinsic.

3. The method of claim 1, further comprising:
generating a third set of instructions which, when executed, causes the hardware platform to perform the hardware intrinsic, and one or more of:
generating a fourth set of instructions which, when executed, places a set of values corresponding to the set of argument types for the function into one or more memory constructs based on a first set of bindings associated with the hardware intrinsic and including the fourth set of instructions in the second set of instructions such that the fourth set of instructions executes prior to the third set of instructions, or
generating a fifth set of instructions which, when executed, retrieves a second set of values corresponding to the set of return types for the function from a second set of memory constructs based on a second set of bindings associated with the hardware intrinsic and including the fifth set of instructions in the second set of instructions such that the third set of instructions executes after the third set of instructions.

4. The method of claim 3, wherein the one or more memory constructs include one or more of: a set of registers, a stack within a stack frame, or a heap.

5. The method of claim 1, wherein the function for accessing the hardware intrinsic and first set of instructions are received as part of a class file for a particular class.

6. The method of claim 1, wherein the definition of the function and the first set of instructions represent source code that has been compiled by a compiler into an intermediate form.

7. The method of claim 6, wherein the source code adheres to Java language and the intermediate form represents a class file that includes the metadata and the first set of instructions, wherein the first set of instructions are one or more bytecode instructions.

8. The method of claim 1, wherein:
the set of machine instructions which, when executed, causes the hardware platform to perform the hardware intrinsic includes symbolic machine code; and
the method further includes sending the symbolic machine code to an assembler to generate one or more actual machine code instructions to include within the second set of instructions.

9. The method of claim 1, wherein the hardware intrinsic represents functionality that is natively implemented by the hardware platform.

10. The method of claim 1 wherein:
the virtual machine uses a plurality of registers or register types;
said second set of instructions is based on a register mask that indicates a subset of said plurality of registers or register types that are available.

11. A non-transitory computer-readable storage medium storing one or more instructions which, when executed by one or more processors, cause:
a virtual machine receiving metadata describing one or more elements supporting a set of instructions, wherein the metadata includes a definition of a function for accessing a hardware intrinsic that implements a particular feature, wherein the definition of the function includes a name of the function and a type of the function, wherein the type of the function specifies a set of argument types for the function and a set of return types for the function, wherein the set of instructions includes a first set of instructions which implements the function for accessing the hardware intrinsic and which, when executed, causes invocation of a particular function reference;
the virtual machine receiving an instruction that specifies to invoke the function for accessing the hardware intrinsic;

the virtual machine dynamically:
    detecting whether a hardware platform upon which the virtual machine is executing supports the particular feature, and
    selecting, based on said whether the hardware platform supports the particular feature, a second set of instructions from:
        a set of machine instructions which, when executed, causes the hardware platform to perform the hardware intrinsic, and
        a set of machine instructions which provide a software implemented version of functionality provided by the hardware intrinsic;
    after said selecting said second set of instructions, the virtual machine binding the particular function reference to the second set of instructions such that invocation of the particular function reference causes execution of the second set of instructions;
    the virtual machine executing said set of instructions, including the first set of instructions.

12. The non-transitory computer-readable storage medium of claim 11, wherein one or more items related to the hardware intrinsic include one or more of: a name for the hardware intrinsic, a set of argument types for the hardware intrinsic, a set of return types for the hardware intrinsic, one or more bindings that indicate one or more memory constructs in which to store a set of values corresponding to the set of argument types for the hardware intrinsic prior to the hardware platform performing the hardware intrinsic, or one or more bindings that indicate one or more memory constructs from which to retrieve one or more values corresponding to the set of return types for the hardware intrinsic after the hardware platform performs the hardware intrinsic.

13. The non-transitory computer-readable storage medium of claim 11, wherein the one or more instructions further cause:
    generating a third set of instructions which, when executed, causes the hardware platform to perform the hardware intrinsic, and one or more of:
    generating a fourth set of instructions which, when executed, places a set of values corresponding to the set of argument types for the function into one or more memory constructs based on a first set of bindings associated with the hardware intrinsic and including the fourth set of instructions in the second set of instructions such that the fourth set of instructions executes prior to the third set of instructions, or
    generating a fifth set of instructions which, when executed, retrieves a second set of values corresponding to the set of return types for the function from a second set of memory constructs based on a second set of bindings associated with the hardware intrinsic and including the fifth set of instructions in the second set of instructions such that the third set of instructions executes after the third set of instructions.

14. The non-transitory computer-readable storage medium of claim 13, wherein the one or more memory constructs include one or more of: a set of registers, a stack within a stack frame, or a heap.

15. The non-transitory computer-readable storage medium of claim 11, wherein the function for accessing the hardware intrinsic and first set of instructions are received as part of a class file for a particular class.

16. The non-transitory computer-readable storage medium of claim 11, wherein the definition of the function and the first set of instructions represent source code that has been compiled by a compiler into an intermediate form.

17. The non-transitory computer-readable storage medium of claim 16, wherein the source code adheres to Java language and the intermediate form represents a class file that includes the metadata and the first set of instructions, wherein the first set of instructions are one or more bytecode instructions.

18. The non-transitory computer-readable storage medium of claim 11, wherein:
    the set of machine instructions which, when executed, causes the hardware platform to perform the hardware intrinsic includes symbolic machine code; and
    the one or more instructions further cause sending the symbolic machine code to an assembler to generate one or more actual machine code instructions to include within the second set of instructions.

19. The non-transitory computer-readable storage medium of claim 11, wherein the hardware intrinsic represents functionality that is natively implemented by the hardware platform.

* * * * *